Nov. 13, 1956 A. R. KAHMANN ET AL 2,770,533
CRYSTAL PURIFICATION APPARATUS CONTROL
Filed Dec. 1, 1952 3 Sheets-Sheet 1
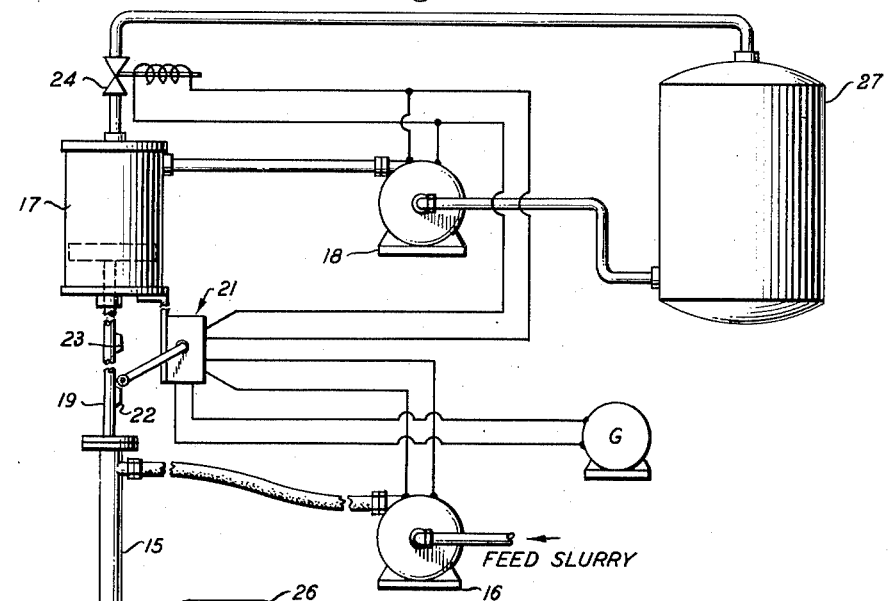
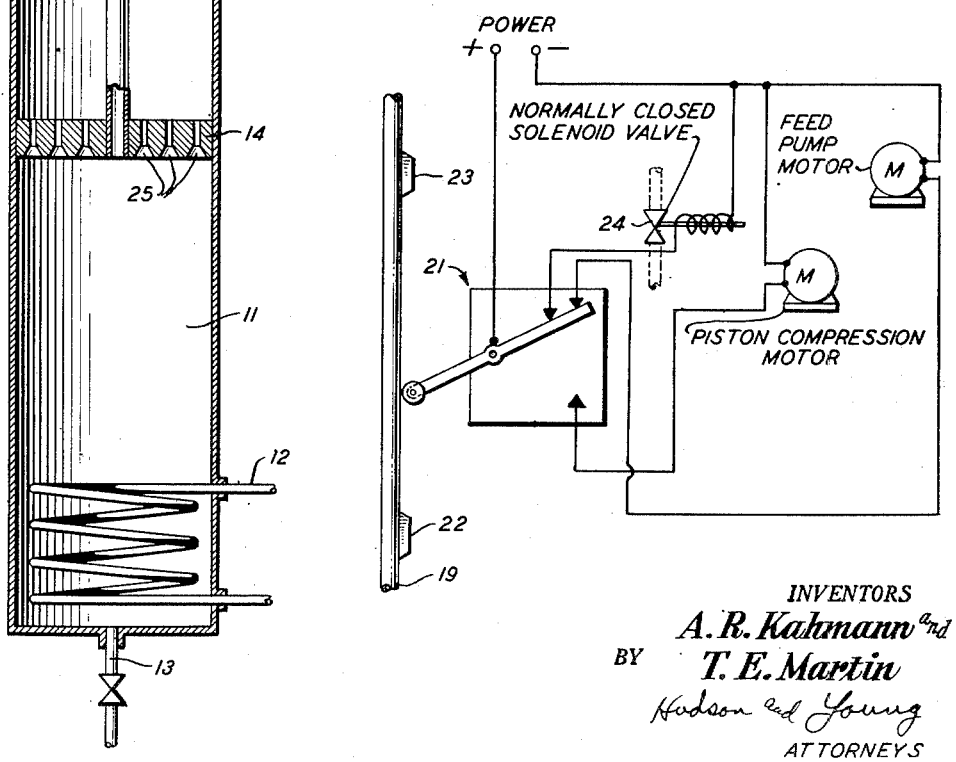
INVENTORS
A. R. Kahmann and
BY T. E. Martin
Hudson and Young
ATTORNEYS Nov. 13, 1956 A. R. KAHMANN ET AL 2,770,533
CRYSTAL PURIFICATION APPARATUS CONTROL
Filed Dec. 1, 1952 3 Sheets-Sheet 2

INVENTORS
A. R. Kahmann and
BY T. E. Martin
Hudson and Young
ATTORNEYS

United States Patent Office 2,770,533
Patented Nov. 13, 1956

2,770,533

CRYSTAL PURIFICATION APPARATUS CONTROL

Anthony R. Kahmann, Tulsa, Okla., and Tom E. Martin, Topeka, Kans., assignors to Phillips Petroleum Company, a corporation of Delaware Application December 1, 1952, Serial No. 323,390

12 Claims. (Cl. 23—273)

This invention relates to crystal separation and purification from liquid mixtures of organic compounds. In a more specific aspect, this invention relates to a method and apparatus for the control of a crystal purification system.

The separation of compounds can be effected by distillation, solvent extraction, and crystallization. Distillation and extraction processes offer advantages in economy of separation but are limited in their application to compounds having dissimilar boiling points and dissimilar solubility characteristics. Compounds having similar boiling points and similar solubility characteristics can usually be separated only by crystallization. Separation by crystallization offers the advantage over other methods in that a pure product in a single stage of operation is theoretically possible. Crystallization is thus well suited not only for the separation of many chemical isomers which can be separated by no other means but also to purify many other compounds. Although single stage crystallization theoretically offers a pure product, attainment of this ideal stage has been difficult because complete removal of occluded impurities without loss in yield is required.

This application is related to copending application, Serial No. 166,992, filed June 9, 1950 by J. A. Weedman. This copending application describes an improved process and apparatus for the separation and purification of crystals from binary and multi-component liquid organic mixtures which are eutectic forming. The only systems to which this process is not applicable are mixtures of compounds which form solid solutions. The process involves cooling the system from which the separation is to be made so as to form crystals of at least the higher melting component where the composition of the system is on that side of the eutectic favoring crystallization of the higher melting compound. These crystals are then filtered or otherwise removed from the mother liquor and introduced under pressure into a purification column in which a melt section is maintained in one end thereof. The column of crystals is maintained compact and is continuously or intermittently moved in a compact mass toward the melting section of the purification zone.

The following objects will be attained by the aspects of this invention:

It is an object of this invention to provide a method and apparatus for controlling a crystal purification system.

It is another object of this invention to provide a method and apparatus for introducing a slurry of crystals and mother liquor into a crystal purification system at a point downstream from the compacting piston so as to return the piston to its uppermost position.

It is another object of this invention to provide a method for controlling the action of the piston in a crystal purification apparatus according to the demands of the system.

It is still another object to provide an apparatus whereby the compaction of the crystals in a crystal purification apparatus is improved.

Other objects will be apparent to one skilled in the art upon reading the accompanying disclosure.

We have devised an improved method for controlling crystal purification apparatus operation which comprises introducing a crystal and mother liquor slurry to the purification zone at a point below the compacting piston so that the piston is raised by the feed mixture to the purification zone whereby pressure is maintained on the column of crystals at all times and the reciprocating action of the piston is independent of time but is governed by the demands of the purification process. In a preferred embodiment of our invention crystal slurry is fed to the purification zone, through a hollow shaft actuating the reciprocating piston, by a pump started by a trip mechanism mounted on the piston shaft and tripped when the piston is at the end of its downstroke. This trip mechanism at the same time disengages the motivating power causing the piston to produce its downstroke. The crystal slurry is fed to the purification zone and causes the piston to be raised and at its uppermost position the trip mechanism stops the pump and engages the motivating power causing the downstroke of the piston. In a preferred embodiment of our invention, the piston is provided with performations so that the mother liquor from the slurry and a small portion of melted crystals originating from the heated section of the bottom of the purification zone are forced through the perforations of the piston and are withdrawn from the purification zone.

The accompanying drawing forms a part of this specification and shows, in schematic form, some preferred embodiments of our invention.

Figure 1 shows our invention employing a perforate piston actuated by a hollow shaft through which the crystal and mother liquor slurry is fed to the purification zone.

Figure 4 represents a wiring diagram for use where the power source is electrical.

Figure 2:
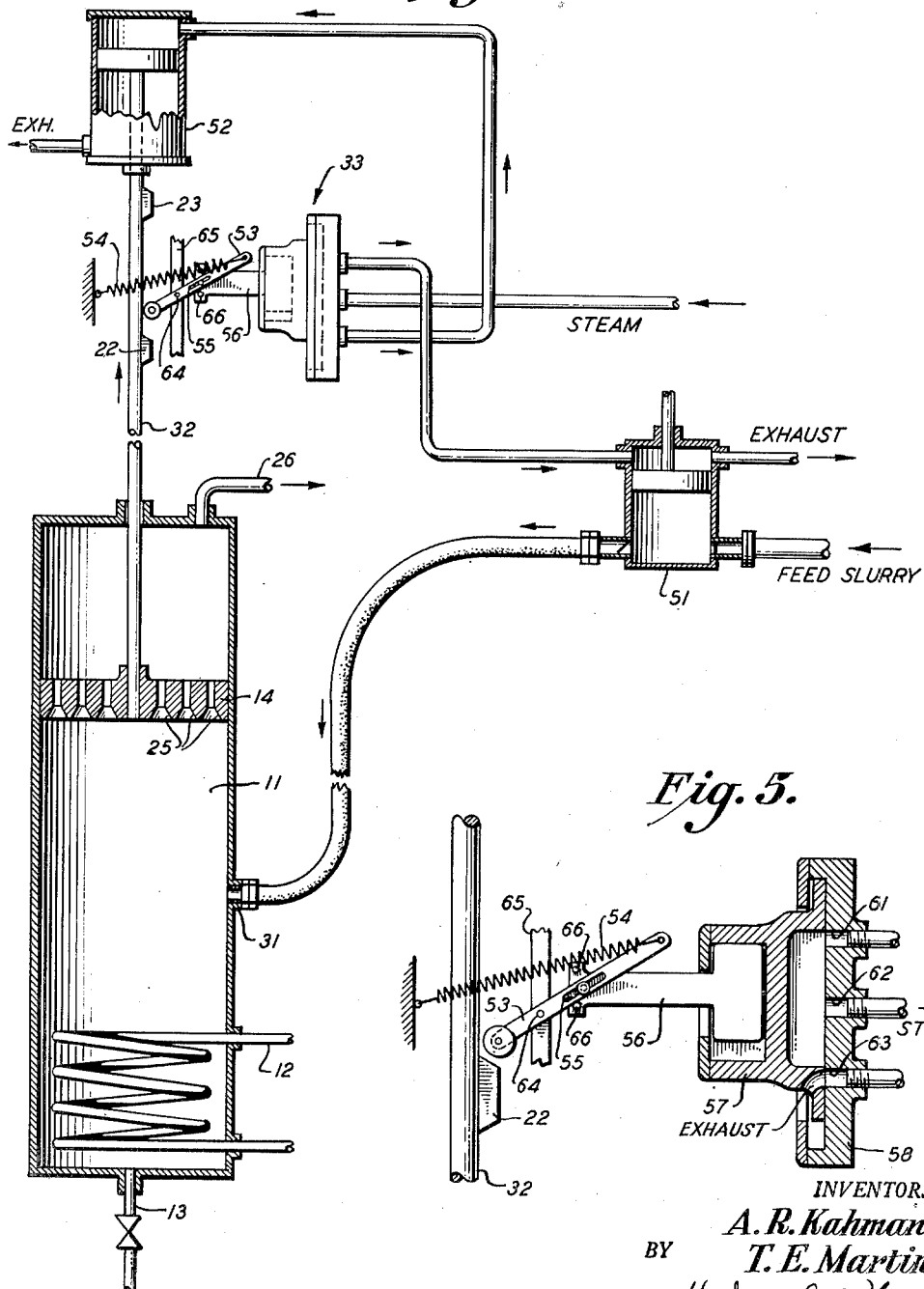
Figure 2 shows a steam operated modification wherein the crystal and mother liquor slurry is fed through the side of the vessel at a point below the downstroke of a perforate piston.

In Figure 1 a vertical crystal purification column 11 containing heating element 12 in the lower portion and a product draw-off line 13 at the bottom thereof, contains a perforate piston 14 at the upper portion actuated by a hollow shaft 15 through which a crystal slurry is fed by pump 16 connected to a source of crystal and mother liquor slurry (not shown). Hollow shaft 15 is connected at its upper end to a motivating power source which can be a pneumatic or hydraulic cylinder and piston 17 operated by an electrically powdered pump and motor 18 through connecting rod 19. A trip mechanism 21, shown as a snap action, double-pole, double-throw switch is actuated by cams or triggers 22 and 23. Trip mechanism 21 is constructed so that when actuated by trigger 22 at the completion of the upstroke of piston 14, pump 16 is stopped, solenoid vent valve 24 is closed and pump 18 is started. Trip mechanism 21 is also constructed so that when actuated by trigger 23 at the completion of the downstroke of piston 14, solenoid 24 is opened, pump 18 is stopped, and pump 16 is started. The mother liquor and wash liquor are forced through perforations 25 of piston 14 and removed through outlet opening 26 in the upper portion of vessel 11. The compression fluid in cylinder 17 is vented through valve 24 to surge tank 27.

Figure 2 shows a steam operated modification of our crystal purification apparatus control wherein the crystal and mother liquor slurry is fed to the purification zone at a point below the downstroke of the piston 14 through the side of the vessel wall 11 indicated at 31. Perforate piston 14 is actuated by solid connecting rod 32 and is controlled by the snap acting steam valve 33 shown in detail in Figure 5. Steam valve 33 is constructed so as to avoid stopping on dead-center. When the steam actuated pump 51 is feeding crystal slurry to the purification column 11, the steam port in valve 33 to pump 51 is fully open and the steam port to piston compressing steam cylinder 52 is fully closed. When trigger 22 forces trip lever 53 past a position normal to connecting-rod 32, against the tension of spring 54, valve 33 is operated suddenly to close the steam port to pump 51 and open the steam port to steam cylinder 52 causing piston 14 to start a downward stroke. Valve 33 is similarly operated by trigger 23 at the completion of the downstroke and the cycle is repeated.

Pump 51 can be operated by a reciprocating steam pump or a steam turbine. Cylinder 52 is a conventional steam cylinder, exhausted by known means at the completion of the downstroke.

Figure 3:
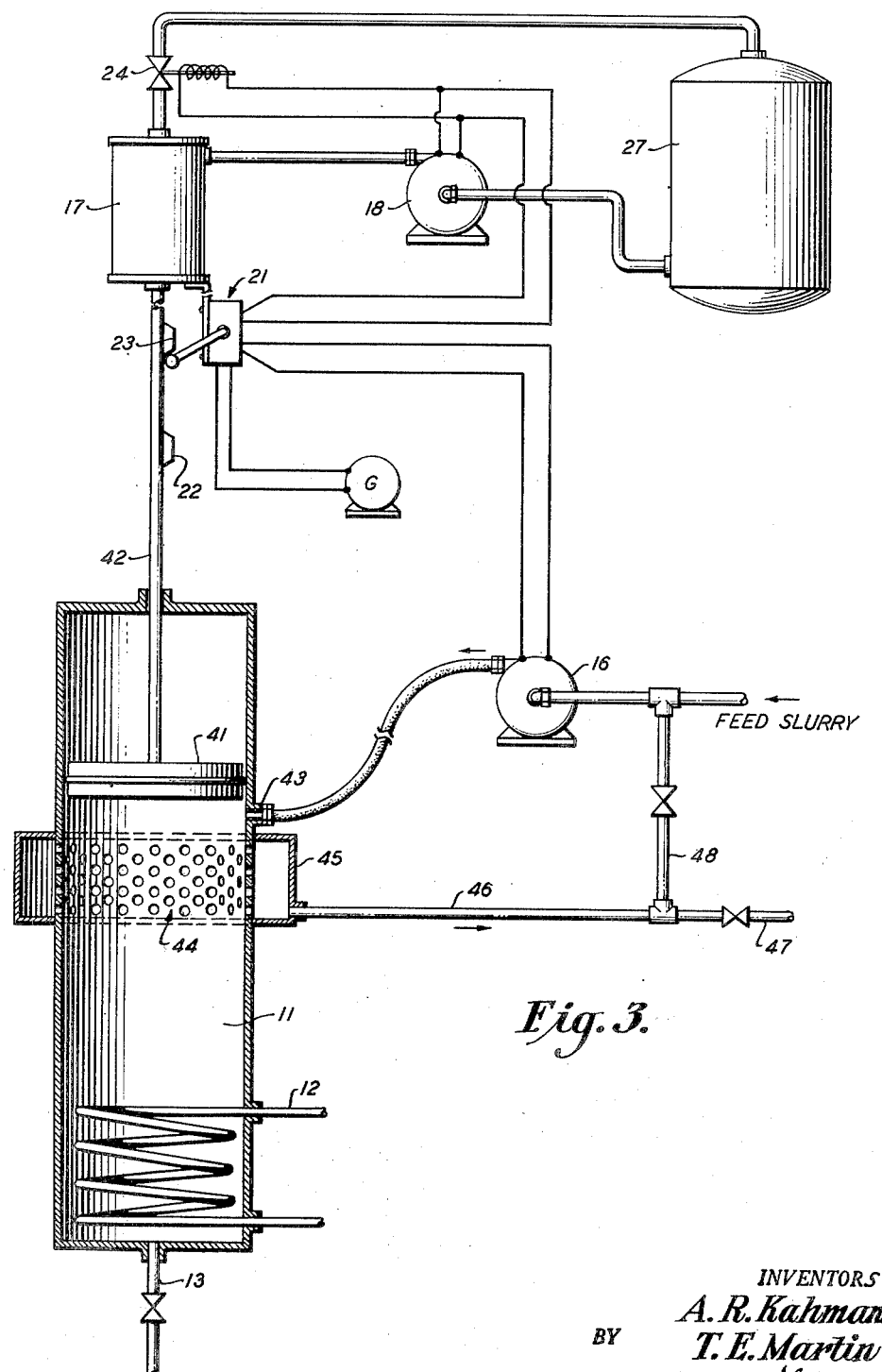
Figure 3 shows a modification wherein the crystal and mother liquor slurry is fed through the side of the vessel to a point below the downstroke of a solid piston and the mother liquor is removed through a perforate section of the vessel.

The modification in Figure 3 shows crystal purification vessel 11 containing solid piston 41 actuated by connecting rod 42 and controlled by the trip mechanism shown in Figure 1. The crystal and mother liquor slurry is fed to the crystal purification zone through the side of vessel 11 at 43 at a point below the downstroke of piston 41. The mother liquor and wash liquid are removed from the purification zone through perforate section 44 in the wall of vessel 11, collected in liquid receiver 45 and removed through line 46. This liquid mixture can be removed from the system through line 47 or recycled in whole or in part through line 48 to pump 16.

The operation of the control system shown in Figure 1 is as follows: with the piston 14 at the bottom of its stroke limit switch 21, operated by trigger 23 is actuated which starts the feed pump 16 into operation, opens the solenoid valve 24, venting pneumatic or hydraulic cylinder 17, and shuts off pump 18. The piston is forced to the top of vessel 11 by pressure of the feed slurry filling the vessel. When the vessel is filled with the desired amount of feed slurry, the limit switch 21 is again actuated by trigger 22, turning off the feed pump 16, closing the solenoid 24, and starting pump 18 to give downward force to the piston. As the piston reaches the bottom of its stroke the cycle is repeated.

Figure 5:
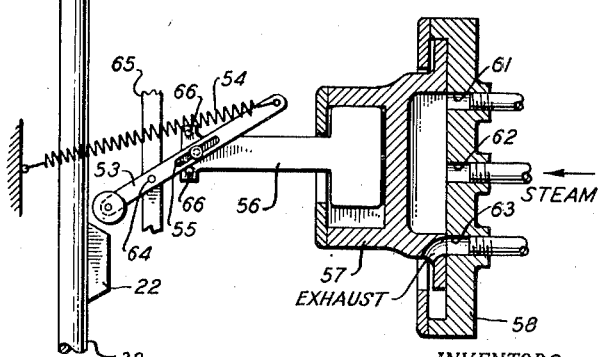
Figure 5 shows a valve arrangement for use where the power source is steam, compressed air or other fluid power.

The operation of valve 33, shown in Figure 5, is as follows: with port 61 open, steam enters through port 62 and operates pump 51 (Figure 2), feeding slurry to column 11 and raising piston 14. Lever 53 is moved by trigger 22, against tension of spring 54, along slot 55. Connecting member 56 is also moved downward at least a part of the extent of its free travel in case 57 of valve 33. When lever 53 is forced past a position normal to connecting rod 32, spring 54 acting through lever 53 and connecting member 56 moves valve case 57 in valve base 58 so as to close port 61 and open port 63. The operation is reversed when piston 14 has been raised to its uppermost position.

The control system of this invention is advantageous in that it is automatic and is independent of time in the repetition of the cycle of the piston strokes. The downward force exerted on the piston is substantially constant for each stroke and the time required for each downward stroke is substantially the same. The upward stroke, however, is dependent upon the time required for filling the vessel with crystals and thus raising the piston of its uppermost position. The time required to raise the piston is dependent upon the fluidity of the crystal and mother liquor slurry, the rate at which crystals are being melted in the lower portion of the vessel, the rate of withdrawal of product from the bottom portion of the vessel and other variables incident to the process. The crystal plug or column is subjected to some pressure during the upward stroke of the piston and at least partial continuity of compressing the crystal column toward the melting end of the vessel is attained even during the upward stroke of the piston.

The process and apparatus of the invention are applicable to the vast number of simple binary and complex multi-component systems. It is applicable to mixtures of compounds which have practically the same boiling point and also the same freezing point or to mixtures which have quite diverse boiling and freezing points. From a consideration of the phase diagram of a binary system which forms a eutectic it is obvious that either component (depending upon the location of the specific mixture on the diagram) may be separated by freezing until the concentration of the mother liquor reaches the approximate eutectic point. It is also apparent that effective separation of the components may be made from systems where the concentration of one component is relatively high, such as 97 or 98%, or where the concentrations of the components are about equal. One particularly advantageous application of the process lies in the purification of a component of, say, 95 to 98% purity so as to effect a purity upwards of 99.9%. In order to illustrate a few of the systems to which the invention is applicable, the following compounds are grouped with respect to their close boiling points:

| Group A | B. P., °C. | F. P., °C. |
| --- | --- | --- |
| Benzene | 80 | 5.5 |
| n-hexane | 69 | −94 |
| n-heptane | 98.52 | −90.5 |
| Carbon tetrachloride | 77 | −22.8 |
| Acrylonitrile | 79 | −82 |
| Ethyl alcohol | 78.5 | −117.3 |
| 2,2-dimethylpentane | 79 | −125 |
| 3,3-dimethylpentane | 86 | |
| Methyl ethyl ketone | 79.6 | −86.4 |
| Methyl propionate | 79.9 | −87.5 |
| Methyl acrylate | 80.5 | |
| 1,3-cyclohexadiene | 80.5 | −98 |
| 2,4-dimethylpentane | 80.8 | −123.4 |
| 2,2,3-trimethylbutane | 80.9 | −25 |
| Cyclohexane | 81.4 | 6.5 |
| Acetonitrile | 82 | −42 |
| Cyclohexene | 83 | −103.7 |
| 2-methylhexane | 90 | −119 |
| 3-methylhexane | 89.4 | −119.4 |

| Group B | B. P., °C. | F. P., °C. |
| --- | --- | --- |
| Methyl cyclohexane | 100.3 | −126.3 |
| Cyclohexane | 81.4 | 6.5 |
| n-heptane | 98.52 | −90.5 |
| 2,2,4-trimethylpentane (isooctane) | 99.3 | −107.4 |
| Nitromethane | 101 | −29 |
| p-dioxane | 101.5 | 11.7 |
| 2-pentanone | 101.7 | −77.8 |
| 2-methyl-2-butanol | 101.8 | −11.9 |
| 2,3-dimethylpentane | 89.4 | |
| 3-ethylpentane | 93.3 | −94.5 |

| Group C | B. P., °C. | F. P., °C. |
| --- | --- | --- |
| Toluene | 100.8 | −95 |
| Methylcyclohexane | 100.3 | −126.3 |
| 2,2,3,3-tetramethyl butane | 106.8 | 104 |
| 2,5-dimethylhexane | 108.25 | −91 |
| 2,4-dimethylhexane | 110 | |
| 2,3-dimethylhexane | 113.9 | |
| 3,4-dimethylhexane | 116.5 | |
| 3-ethyl-2-methylpentane | 114 | |
| 3-ethyl-3-methylpentane | 119 | |

| Group D | B. P., ° C. | F. P., ° C. |
|---|---|---|
| Aniline | 184.4 | −6.2 |
| Toluene | 110.8 | −95 |
| Benzene | 80.0 | 5.5 |

| Group E | B. P., ° C. | F. P., ° C. |
|---|---|---|
| Carbon tetrachloride | 77 | −22.8 |
| Chloroform | 61 | −63.5 |
| $CS_2$ | 46.3 | −108.6 |
| Acetone | 56.5 | −95 |

| Group F | B. P., ° C. | F. P., ° C. |
|---|---|---|
| Ortho-xylene | 144 | −27.1 |
| Meta-xylene | 138.8 | −47.4 |
| Para-xylene | 138.5 | 13.2 |

| Group G | B. P., ° C. | F. P., ° C. |
|---|---|---|
| Ortho-cymene | 175.0 | −73.5 |
| Meta-cymene | 175.7 | <−25 |
| Para-cymene | 176.0 | −73.5 |

Systems consisting of any combination of two or more of the components within any one of the groups may be separated by the process of the invention as well as systems made up of components selected from different groups; for example, benzene may be separated from a benzene-n-hexane or n-heptane system in which the benzene is present in an amount greater than the eutectic concentration. In the same manner, para-xylene may be readily separated from a mixture of para- and meta-xylenes or from para-, meta-, and ortho-xylenes. Benzene may also be separated from a mixture of toluene and/or aniline. Multi-component systems which may be effectively separated so as to recover one or more of the components in substantially pure form include 2,2-dimethylpentane, 2,4-dimethylpentane, 2,2,3-trimethylbutane; methyl cyclohexane, 2,2,4-trimethylpentane; and carbon tetrachloride, chloroform, acetone. The invention is also applicable to the separation of individual components from a system of cymenes and a system including the xylenes.

Reasonable variations and modifications are possible within the scope of the disclosure of the present invention, the essence of which is that an improved crystal purification apparatus control is provided by feeding a crystal and mother liquor slurry into a crystal purification vessel so that the piston is raised by being displaced by the crystals fed to the purification vessel.

We claim:

1. In an apparatus for the separation and purification of crystals comprising an elongated, closed vessel having a heater disposed in the downstream portion of said vessel with respect to the flow of crystals, a perforate, reciprocable piston disposed in the upstream portion of said vessel adapted to produce a longitudinal compression stroke, an outlet opening in the upstream portion and an outlet opening in the downstream portion the improvement comprising a crystal feed inlet positioned so as to introduce feed downstream from the downstream face of the piston with respect to the flow of crystals; means for supplying a slurry of crystals and mother liquor to said inlet; means for imparting a longitudinal compression stroke to said piston downstream with respect to the flow of crystals; means actuated by the piston at the completion of the compression stroke to disengage the means for imparting the compression stroke and to engage the means for supplying the crystal slurry, and actuated by the piston at the opposite position of longitudinal reciprocation to engage the means for imparting the compression stroke and to disengage the means for supplying the crystal slurry.

2. The apparatus of claim 1 wherein said feed inlet is through a hollow shaft actuating said piston.

3. The apparatus of claim 1 wherein said feed inlet is in said vessel wall downstream from the piston at the end of the compression stroke.

4. The apparatus of claim 1 wherein said means for producing a compression stroke and means for supplying crystal slurry are actuated electrically and said means actuated by the piston is a switch.

5. In an apparatus for the separation and purification of crystals which comprises an upright, elongated, closed chamber having a heater disposed in the lower portion of said chamber adapted to melt and maintain a melt of crystals therein and a perforate, reciprocable piston disposed in the upper portion of said chamber the improvement which comprises a hollow shaft secured to said piston and communicating with the area below said piston and with a source of crystal and mother liquor slurry; an electrically powered pump in communication with said hollow shaft and said source of slurry; cam means attached to said hollow shaft; a source of electrically motivated power adapted to impart a downward compression stroke to said piston; a switch actuated by the travel of said piston shaft and cam means so as to disengage said motive power upon completion of said compression stroke and to start said pump so as to force slurry through said hollow shaft and raise said piston, and to disengage said pump and start said motive power so as to produce a compression stroke upon completion of raising said piston; an opening in the upper section of said chamber for removing mother liquor and liquid reflux substantially free from crystals; and a liquid-product outlet in the lower section of said chamber.

6. An apparatus for the separation and purification of crystals which comprises an upright, elongated, closed chamber; a heater disposed in the lower portion of said chamber adapted to melt and to maintain a melt of crystals therein; a reciprocable, perforate piston disposed in the upper portion of said chamber and having a hollow actuating shaft communicating with the area below said piston and with a source of crystal and mother liquor slurry; a pump in communication with said hollow shaft and said source of slurry; cam means attached to said hollow shaft; a source of motive power adapted to impart a downward compression stroke to said piston; a trip device actuated by said cam means to disengage said motive power upon completion of said compression stroke, to start said pump so as to force slurry through said hollow shaft to raise said piston, to stop said pump on completion of raising said piston and to engage said source of motive power; an opening at the top of said chamber for removing mother liquor; and an opening at the bottom of said chamber for removing melted product.

7. An apparatus for the separation and purification of crystals which comprises an elongated, closed chamber; a heater disposed within the downstream portion of said chamber with respect to the flow of crystals to melt and to maintain a melt of crystals therein; a reciprocable, perforate piston disposed in the upstream portion of said chamber; an inlet opening in said chamber between said heater end and the downstream face of said piston with respect to the flow of crystals in communication with a source of crystals and mother liquor; a pump in communication with said opening and said slurry source; a shaft connecting said piston to a source of motive power to impart a longitudinal compression stroke to said piston; a trip device actuated by said piston and shaft to disengage said motive power upon completion of said compression stroke, to start said pump so as to force said slurry through said inlet opening whereby said piston is retracted, and to stop said pump upon completion of retracting said piston and to engage said motive power source; an outlet opening in the upstream portion of said chamber for removing mother liquor and wash liquid substantially free of crystals; and an opening in the downstream portion of said chamber for removing melted product.

8. An apparatus for the separation and purification of crystals which comprises an upright, elongated, closed chamber; a heater disposed within the lower portion of said chamber to melt and to maintain a melt of crystals therein; a reciprocable, imperforate piston disposed in the upper portion of said chamber; an inlet opening in said chamber at a level below said piston at its downstroke and in communication with a source of crystal and mother liquor slurry; a pump in communication with said inlet opening and said slurry source; a liquid pervious, crystal impervious outlet opening in said chamber at a level below said inlet opening; a product outlet opening in the lower portion of said chamber; a shaft connecting said piston to a source of motive power to impart a downward compression stroke to said piston; a first cam and a second cam mounted upon said shaft; a trip device actuated by said first cam on said shaft to disengage said motive power upon completion of said compression stroke and to start said pump so as to force said slurry through said inlet opening whereby said piston is raised and actuated by said second cam to stop said pump upon completion of raising said piston and to engage said motive power source.

9. The apparatus of claim 8 wherein the trip device is a switch and said pump and said source of motivating power are both electrically operated.

10. The apparatus of claim 8 wherein the trip device is a valve and said pump and source of motive power are both steam operated.

11. In an apparatus for the separation and purification of crystals comprising an elongated, closed vessel having inlets and outlets and having a heater disposed in the downstream portion with respect to the flow of crystals, the improvement comprising a reciprocable first piston disposed in the upstream portion to produce a longitudinal compression stroke; a crystal-mother liquor slurry feed inlet positioned so as to introduce the feed downstream from the downstream face of said piston with respect to the flow of crystals; a first pump communicating with a source of crystal-mother liquor slurry and with said feed inlet; a cylinder containing a second piston; a shaft connecting said first piston and said second piston; a supply of pressure fluid; a second pump for supplying said pressure fluid to the face of said second piston opposite said shaft; a trip device operatively connected to said first pump and to said second pump to start and to stop said pumps; a first cam on said shaft to actuate said trip device means when said first piston is in extended position, to stop said second pump and to start said first pump; a second cam means on said shaft to actuate said trip device when said first piston is in retracted position, to stop said first pump and to start said second pump.

12. An apparatus for the separation and purification of crystals comprising an elongated, closed vessel; heating means operatively connected to one end of said vessel; a reciprocable piston disposed in the opposite end of said vessel and being movable toward and away from said heating means; an inlet opening communicating with the interior of said vessel at a point in said interior, said point in said interior lying between said piston at the extended end of its stroke and said heating means; liquid pervious, crystal impervious filter means establishing communication between a region exterior of said vessel and a region in the interior of said vessel, said region in the interior of said vessel lying between said piston and said heating means; means for introducing a slurry of crystals and mother liquor to said inlet; a source of motive power to move said piston to its extended position; and means actuated by the motion of said piston to apply alternately said power to extend said piston and to introduce said slurry to said inlet whereby said piston is moved to its retracted position.

References Cited in the file of this patent

UNITED STATES PATENTS

| | | |
|---|---|---|
| 2,613,136 | McKay | Oct. 7, 1952 |
| 2,615,794 | Shelby | Oct. 28, 1952 |
| 2,617,274 | Schmidt | Nov. 11, 1952 |